(12) United States Patent
Eberlein

(10) Patent No.: US 12,240,354 B2
(45) Date of Patent: Mar. 4, 2025

(54) LINE SECTION FOR THE OPERATION OF ELECTRICALLY DRIVEN RAIL VEHICLES

(71) Applicant: Surim Eberlein, Kammeltal (DE)

(72) Inventor: Surim Eberlein, Kammeltal (DE)

(73) Assignee: Surim Eberlein, Kammeltal (DE)

( * ) Notice: Subject to any disclaimer, the term of this patent is extended or adjusted under 35 U.S.C. 154(b) by 217 days.

(21) Appl. No.: 17/467,047

(22) PCT Filed: Jan. 6, 2021

(86) PCT No.: PCT/DE2021/000001
§ 371 (c)(1),
(2) Date: Sep. 3, 2021

(87) PCT Pub. No.: WO2021/139852
PCT Pub. Date: Jul. 15, 2021

(65) Prior Publication Data
US 2023/0173952 A1    Jun. 8, 2023

(30) Foreign Application Priority Data

Jan. 8, 2020 (DE) .......................... 102020000076.2

(51) Int. Cl.
*B60M 1/30* (2006.01)
*B60L 5/39* (2006.01)
(Continued)

(52) U.S. Cl.
CPC .................. *B60M 1/30* (2013.01); *B60L 5/39* (2013.01); *B60M 1/02* (2013.01); *B60M 5/00* (2013.01); *B60L 2200/26* (2013.01)

(58) Field of Classification Search
CPC .......... B60L 2200/26; B60L 5/39; B60L 5/38; B60M 1/04; B60M 1/02; B60M 1/30; B60M 5/00
See application file for complete search history.

(56) References Cited

U.S. PATENT DOCUMENTS 727,227 A * 5/1903 Thompson ............... B60M 1/04
191/30
728,324 A * 5/1903 Stewart ................... B60M 1/04
191/30
(Continued)

FOREIGN PATENT DOCUMENTS

DE         29068 C      10/1884
DE       2146680 A1      3/1972
(Continued)

OTHER PUBLICATIONS

Ihme, Joachim: "Schienenfahrzeugtechnik." Springer: Wiesbaden, 2016, pp. 1-29—ISBN 978-3-658-13541-6 (Deutsch).
(Continued)

*Primary Examiner* — Zachary L Kuhfuss
*Assistant Examiner* — Cheng Lin
(74) *Attorney, Agent, or Firm* — Harness, Dickey & Pierce, P.L.C.

(57) ABSTRACT

The invention relates to a line section for the operation of electrically driven rail vehicles, with a track which exhibits two parallel rails, with a contact line borne by an insulator, said contact line being arranged on one side of the track in a spatial region extending parallel to the rails, wherein the contact line is intended to supply current-collectors of the electrically driven rail vehicles with current and to support said current-collectors from underneath, and wherein the contact line and the insulator bearing the contact line are intermittently interrupted or not interrupted. The support device, which is non-functional for the power supply of the rail vehicle, is arranged on the other side of the track in a second spatial region extending parallel to the rails. The support device is intended to support current-collectors of the electrically driven rail vehicles from underneath without supplying them with current.

32 Claims, 3 Drawing Sheets

Figure 1:
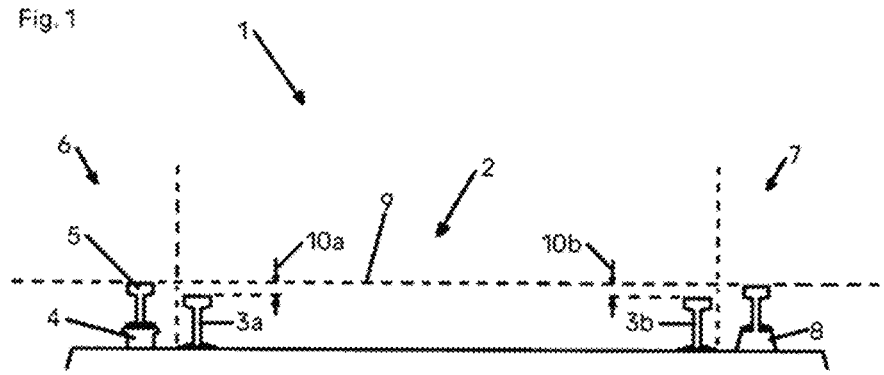

(51) Int. Cl.
  *B60M 1/02* (2006.01)
  *B60M 5/00* (2006.01)

(56) References Cited

U.S. PATENT DOCUMENTS

| | | | | |
|---|---|---|---|---|
| 730,058 | A | | 6/1903 | Tinker |
| 757,264 | A | * | 4/1904 | Cable ................. B60M 1/04 191/30 |
| 772,282 | A | * | 10/1904 | Leonard ............... B60L 5/39 37/204 |
| 1,861,523 | A | * | 6/1932 | Clark ................. B60L 5/38 104/295 |
| 3,475,568 | A | * | 10/1969 | Dehn ................. B60M 1/04 191/35 |
| 3,740,498 | A | * | 6/1973 | Herbert ............... B60L 5/38 191/49 |
| 9,321,372 | B2 | * | 4/2016 | Kanemori ............. B60M 1/307 |
| 2006/0071862 | A1 | | 4/2006 | Aisenbrey |

FOREIGN PATENT DOCUMENTS

| | | | | |
|---|---|---|---|---|
| DE | 102007011709 | A1 | | 8/2008 |
| FR | 2894888 | A1 | | 6/2007 |
| GB | 1341611 | A | | 12/1973 |
| KR | 20100114314 | A | * | 10/2010 ............... B60L 5/39 |

OTHER PUBLICATIONS

International Search Report (English and German) and Written Opinion (German) of the International Searching Authority issued in PCT/DE2021/000001, mailed May 3, 2021; ISA/EP.
Expert Response on Invention Patent Application and Search Report issued in corresponding Chilean Patent Application No. 2022-01761 on Mar. 14, 2024, with English translation. English translation provided by Carey law firm, Santiago, Chile.
Resolution of Acceptance for Registration issued in corresponding Chilean Patent Application No. 2022-01761 on Apr. 12, 2024, with English translation. English translation provided by Carey law firm, Santiago, Chile.
Hme, Joachim: "Schienenfahrzeugtechnik." Springer: Wiesbaden, 2016, pp. 1-29—ISBN 978-3-658-13541-6, with English translation.
Furrer+Frey®, "Deckenstromschienen DSS System", 2012.
Examination Notice in German Patent Application No. 10 2020 000 076.2, issued Sep. 14, 2020.
Decision to Grant in German Patent Application No. 10 2020 000 076.2, issued Nov. 13, 2020.
First Examination Report in Chilean Patent Application No. 202201761, Date of presentation Oct. 13, 2023, with machine translation.

* cited by examiner

LINE SECTION FOR THE OPERATION OF ELECTRICALLY DRIVEN RAIL VEHICLES

CROSS-REFERENCE TO RELATED APPLICATIONS

This application is a U.S. Bypass Continuation Application and claims priority to International Application No. PCT/DE2021/000001, filed on Jan. 6, 2021, which claims priority to German Patent Application No. 102020000076.2, filed on Jan. 8, 2020. The entire disclosures of the above applications are expressly incorporated by reference herein.

The invention relates to a line section for the operation of electrically driven rail vehicles, with a track which exhibits two parallel rails, with a contact line borne by an insulator, said contact line being arranged on one side of the track in a spatial region extending parallel to the rails, wherein the contact line is intended to supply current-collectors of the electrically driven rail vehicles with current and to support said current-collectors from underneath, and wherein the contact line and the insulator bearing the contact line are intermittently interrupted or not interrupted.

For the purpose of supplying track-bound, electrically driven vehicles with electricity during a journey, first and foremost the overhead line and the lateral third rail have proved suitable. The overhead line is especially suitable for main-line railroads having a high proportion of ground-level or elevated line sections, since here an endangering of people and animals by the high voltage is practically ruled out by the raised placement of the contact wire. In addition, an overhead line enables the use of alternating current with a high voltage and, as a result, enables the operation of track-guided vehicles at speeds up to more than 400 km/h. On the other hand, there are disadvantages, such as higher installation costs and operating costs, a large space requirement, which is especially disadvantageous from the point of view of costs in tunnels, impeded or impossible deployment of double-stack container railcars, or the visual impairment of the environment. By reason of their small space requirement, third rails are suitable, above all, for urban applications in tunnels. Further advantages are lower installation costs and operating costs, simple maintenance, and greater robustness than in the case of an overhead line. Disadvantageous, above all, are the proximity to the trackway and the endangering, resulting therefrom, of people and animals in the event of contact with the third rail or in the event of a flashover voltage. The interruptions of the third rail at switches result in considerable mechanical forces at the pick-up shoe and also at the third rail, so that, disadvantageously, speeds above 150 km/h are barely possible. The speed record for a train operated with a third rail is only 174 km/h.

Line sections are known having third rails which are arranged on one side of a track and which change sides alternately, depending on the routing of the line. Another configuration that has been considered is the placement of third rails in a shaft between the tracks. Such an arrangement is described in German patent specifications DE 29068 A and DE 10 2007 011 709 A1 and also in French document FR 2 894 888 A1. For the purpose of protection against the hazards stemming from an uncovered third rail, a large number of designs of protective coverings have been devised, including configurations that prevent direct access to the third rail. These configurations are described in USA patent specifications U.S. Pat. Nos. 730,058 A, 757,264 A and 727,227 A.

Furthermore, systems are known having third rails on both sides of the track, the third rails serving at the same time for guiding the track-guided vehicle; for instance, subways in Paris and Montreal. Rail vehicles for operation on the aforementioned line section are described in, amongst other publications, "Ihme, Joachim: *Schienenfahrzeugtechnik*. Springer: Wiesbaden, 2016, pp. 1-29—ISBN 978-3-658-13541-6". On page 27, in the picture at top left, the small-gauge Berlin subway can be seen, and, in the picture at top right, the third rail used by this railway, which is swept from above. Positional tolerances of the third rails are compensated by resilience of the current-collectors of track-guided vehicles. By way of example, document DE 21 46 680 A1 discloses in FIG. 2 a conductor-rail system in conjunction with three spring-loaded current-collectors.

The object of the invention is to develop a line section of the aforementioned type in such a way that the described disadvantages of known solutions are avoided and a supply of current to high-speed trains without an overhead line is made possible.

The solution to the problem with respect to the line section is described in the characterizing part of claim 1.

The crucial advantage of the invention consists in the fact that the space-saving and cost-effective concept of the third rail has been developed further in such a way that it now enables the deployment of high-speed trains.

According to a first advantageous design, the surfaces of the contact line and of the support device which are intended for supporting the current-collectors are situated in a plane, the separations of which, measured perpendicular to the plane, from the first rail and from the second rail of the track are equal. By this means, it is ensured that current-collectors arranged symmetrically on both sides of the rail vehicle are supported on both sides, and complicated folding and unfolding appliances for the current-collectors become unnecessary.

According to a second advantageous design, either the fixed contact line, and the insulator bearing the contact line, or the fixed support device have/has been intermittently interrupted and replaced by a movable support device. The horizontally movable support device arranged in the region of a switch enables an uninterrupted supporting of the current-collectors in the case of both switch positions. In the region of a railroad crossing a higher operative position for the movable support device has been provided, in which the movable support device extends the fixed support device and in this way guarantees an uninterrupted supporting of the current-collectors, and a lower inoperative position for the movable support device has been provided, in which the movable support device does not impede the crossing road traffic. This enables the operation of rail vehicles at speeds well over 150 km/h. According to a third advantageous design, the line section exhibits at least one single-part or multi-part base plate. The line section further exhibits regularly recurring mounting points, arranged on the at least one base plate, which are intended for fastening the insulator bearing the contact line, for fastening the rails, and for fastening the support device. This advantageous design reduces the mounting effort and maintenance effort through a reduction of the number of different parts, through standardization, and through reduced tolerances.

According to a fourth advantageous design, the at least one base plate exhibits, between the mounting points for the insulator bearing the contact line and the mounting points for the adjacent rail, further mounting points which are intended for the mounting of at least one protective cover. On the side of the contact line facing away from the rails, further mounting points for the mounting of at least one protective cover may also have been provided on the base plate. In particular, the use of alternating current for the operation of high-speed trains requires, in terms of safety engineering, a comprehensive insulation and a restricted access to the contact line which, as far as possible, should only be accessible for the current-collector of the rail vehicle. Standardized fastening points and fastening means for insulators of multi-part construction are essential for an uninterrupted and reliably safe installation. The advantageous design makes compact configurations possible which, particularly in tunneling, enable enormous savings by virtue of reduced tunnel diameters.

According to a fifth advantageous design, a portion or a part of the at least one base plate constitutes or bears a sidewalk, the positions and separations from one another of the sidewalk, of the contact line, of the insulator and of the protective covers within the line section always being the same. This permits a simplified structural design of the lateral sidewalk which in some situations, particularly in tunnels and on viaducts, is absolutely essential as prescribed by law.

The invention will be elucidated in more detail in the following.

FIG. 1 shows in cross-section a line section 1 for the operation of electrically driven rail vehicles 19, with a track 2, which exhibits two parallel rails 3*a*, 3*b*, with a contact line 5, borne by an insulator 4, said contact line being arranged on one side of the track 2 in a spatial region 6 extending parallel to the rails 3*a*, 3*b*, wherein the contact line 5 is intended to supply current-collectors 20 of the electrically driven rail vehicles 19 with current and to support said current-collectors from underneath, and wherein the contact line 5 and the insulator 4 bearing the contact line 5 are intermittently interrupted or not interrupted.

Figure 7:
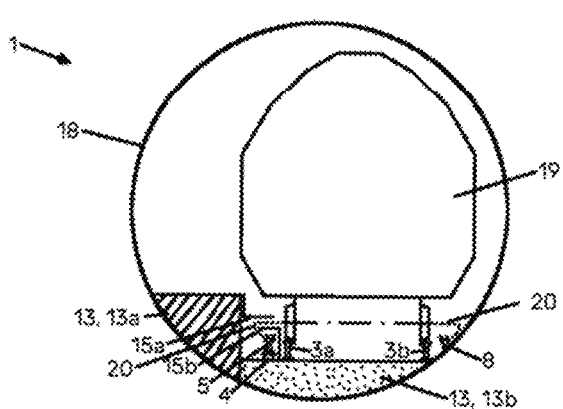

A support device 8, which is non-functional for the power supply of the rail vehicle, is arranged on the other side of the track in a second spatial region 7 extending parallel to the rails 2, said support device being intended to support current-collectors 20 of the electrically driven rail vehicles 19, see FIG. 7 and FIG. 8, from underneath without supplying them with current. The surfaces of the contact line 5 and of the support device 8 which are intended for supporting the current-collectors 20 are situated in a plane 9, the separations 10*a*, 10*b* of which, measured perpendicular to the plane 9, from the first rail 3*a*, adjacent to the contact line, and from the second rail 3*b* of the track 2 are equal.

The support device 8 may have been constructed in a single part or in multiple parts and may consist, for instance, of solid material or of a hollow section. In particular, a support device 8 that is hollow inside may, performing additional functions, accommodate or bear devices 12 supplied with current. Electrical leads, data lines, data-processing devices, control devices, pressure sensors, optical sensors or other sensors, as well as electric lighting, enter into consideration in particular as electrical or electronic devices 12 suppled with current which are arranged on the support device 8. Sensors may provide, in particular, firstly, measured data relating to the line section 1, secondly, measured data relating to the rail vehicle 19 and the running behavior of the rail vehicle 19, and also, thirdly, measured data relating to hazardous situations. An example of the first case is the detection of damage to devices pertaining to the line section 1; an example of the second case is the detection of the position, speed and vibrational behavior of the rail vehicle 19; and an example of the third case is the detection of an obstacle on a railroad crossing.

Figure 2:
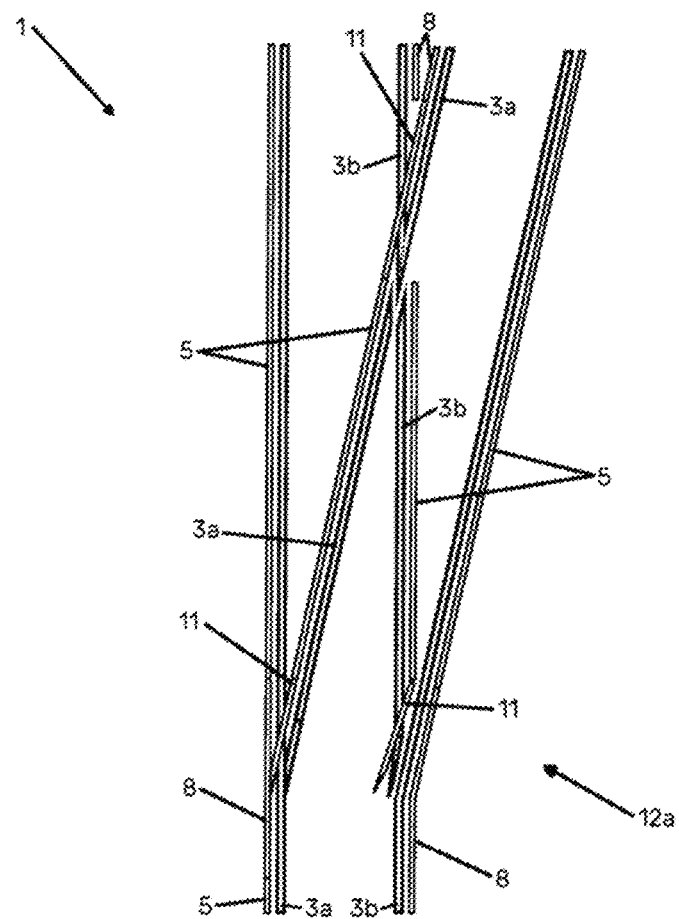
Figure 3:
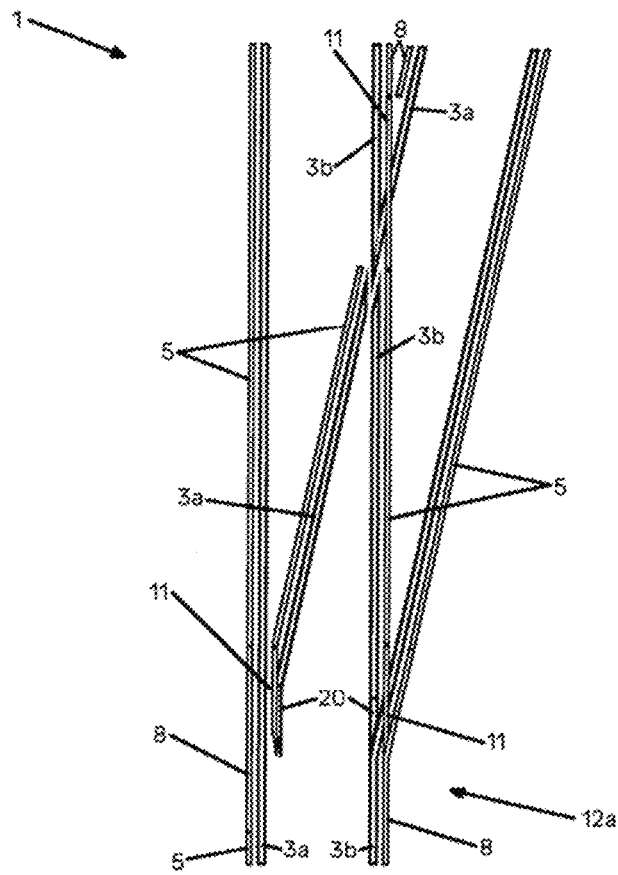

FIG. 2 and FIG. 3 show, from above, the line section 1 with a switch. The contact line 5 and the insulator 4 bearing the contact line 5, and also the support device 8, are intermittently interrupted. Movable support devices 11 replace these in the interruption. This guarantees that the supporting of the current-collectors 20 is uninterrupted in the case of both switch positions. The permanent supporting of the current-collectors 20 is indispensable at relatively high speeds. In the case of the switch position shown in FIG. 2, the branch line is traversed; in the case of the switch position shown in FIG. 3, the main track is traversed. The movable support devices 11 are preferably each supported so as to be capable of being moved horizontally about a pivot.

Figure 4:
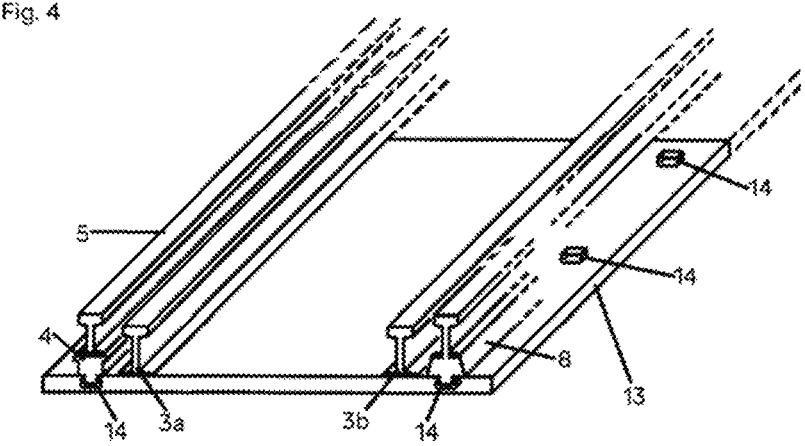

FIG. 4 shows the line section 1 with at least one base plate 13. The line section 1 exhibits regularly recurring mounting points 14 arranged on the at least one base plate 13, which are intended for fastening the insulator 4 bearing the contact line 5, for fastening the rails 3*a*, 3*b*, and for fastening the support device 8. Regularly recurring mounting points 14 may also have been provided for the fastening of further parts, in particular for the protective covers 15 shown in FIG. 7. The parts fastened at mounting points 14 may have been fastened to the base plate 13 with the aid of fastening means—for instance, screws or dowels. In equivalent manner, a mounting point 14 may also have been formed in such a way that the part to be fastened takes up a designated, fixed position on the base plate 13 without fastening means—for instance, by sinking into a recess of the base plate 13 or by being supported on the base plate 13. In the case of multi-part base plates 13, it is crucial that the parts of the base plate 13 take up fixed positions, predetermined relative to one another, so that the aggregate thereof is equivalent to a single-part base plate 13.

Figure 5:
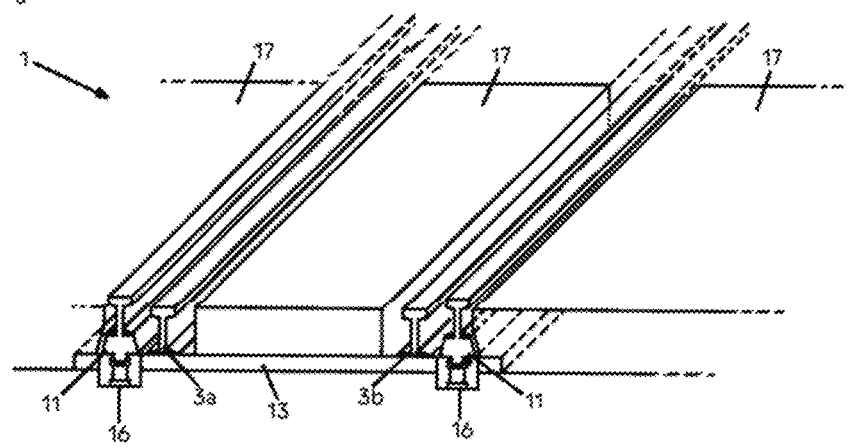

FIG. 5 shows the line section 1 with a road section 17 intersecting it. The surface of the road section 17 is located at the same height as the upper side of the rails 3*a* and 3*b*. The track section 1 exhibits two movable support devices 11 arranged parallel to the rails 3*a* and 3*b*, which can each be moved in the vertical direction by lifting devices 16. FIG. 5 shows the lifting devices 16 and also the movable support devices 11 in the operative position which enables the line section 1 to be traversed by a rail vehicle 19, see FIG. 7 and FIG. 8.

Figure 6:
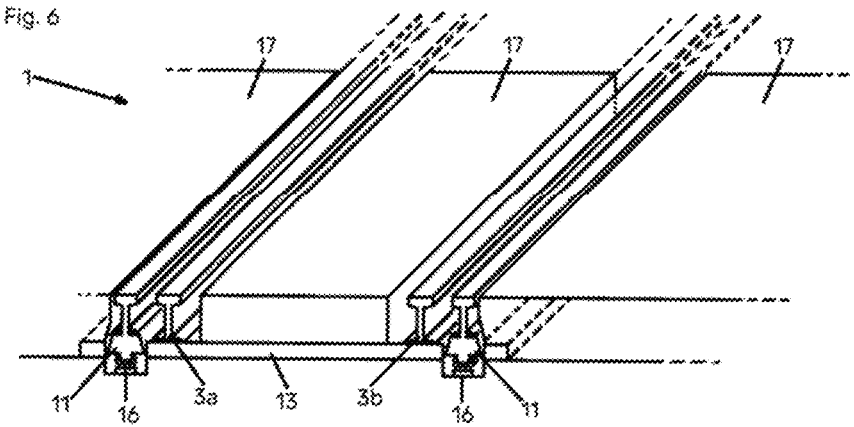

FIG. 6 shows the line section 1 represented in FIG. 5, wherein lifting devices 16 and also the movable support devices 11 are in the inoperative position which enables the line section 1 to be crossed by a road vehicle.

FIG. 7 shows the line section 1 in a circular tunnel 18.

The base plate 13 here is in two parts, consisting of a first part 13*a*, forming a sidewalk, and a lower part 13*b*, bearing the track. The two parts 13*a*, 13*b* take up a defined, fixed position with respect to one another. As a result, it is ensured that dimensional tolerances between the protective cover 15*a* mounted on the first part 13*a* and the protective cover 15*b* mounted on the second part 13*b* are minimized. Depending upon the type of construction, the base plate 13 may have been subdivided further. For instance, the first part 13*a* shown in FIG. 7 may have been subdivided further into an upper part, forming the sidewalk, and a base part, bearing the sidewalk. Such a subdivision may be advantageous, particularly when a usable free space is to be formed between the sidewalk and the base part, or when different materials are to be combined. Deviating from the representation in FIG. 7, such a free space may provide room for the contact line 5 and for the insulator 4 bearing the contact line, so that the sections of the base plate 13 delimiting the free space also perform the function of a protective cover 15. A factor common to all possible configurations is that—in advantageous manner in terms of safety engineering—the facilities utilized by people, in particular the sidewalk, the contact line 5 representing a danger to people, and the insulators 4 and protective covers 15 averting this danger are standardized parts with, at all times, the same positions and separations relative to one another.

Optionally, the protective cover 15a mounted on the first part 13a of the base plate 13 additionally assumes the function of a step which can be stepped on, via which the sidewalk constituted by the first part 13a of the base plate 13 can be reached from the traveling way. The protective covers 15a, 15b have been designed in such a way that the contact line 5, constituted here by a third rail, cannot be reached directly, and accordingly the danger of contact by people is ruled out. The shape of the current-collector 20 of the rail vehicle 19 has been adapted to the shape of the cavity formed by the protective covers 15a, 15b. By virtue of the extended separation of the contact line 5 from the rails 3a and 3b and also from the rail vehicle 19, it is possible to use higher voltages and/or current intensities which simplify the operation of high-speed trains.

The invention claimed is:

1. A line section for the operation of electrically driven rail vehicles, with a track having two parallel rails, with a contact line borne by an insulator, said contact line being arranged on one side of the track in a spatial region extending parallel to the rails, wherein the contact line is intended to supply the current-collectors of the electrically driven rail vehicles with current and to support said current-collectors from underneath, and wherein the contact line and the insulator bearing the contact line are intermittently interrupted or not interrupted, wherein a support device, which is non-functional for the power supply of the rail vehicle, is arranged on the other side of the track in a second spatial region extending parallel to the rails, said support device being intended to support current-collectors of the electrically driven rail vehicles from underneath without providing current, wherein the surfaces of the contact line and of the support device, which are intended for supporting the current-collectors are situated in a plane, the separations of which, measured perpendicular to the plane from the first rail and from the second rail of the track, are equal.

2. The line section according to claim 1, wherein at least one of the contact line, and at least one of the insulator bearing the contact line, and the support device has been intermittently interrupted and replaced by a movable support device.

3. The line section according to claim 2, wherein at least one movable support device is capable of being moved horizontally about a pivot.

4. The line section according to claim 2, wherein at least one movable support device is capable of being moved vertically between an operative position, intended for supporting the current-collector of a rail vehicle, and an inoperative position.

5. The line section according to claim 1, wherein the line section includes at least one base plate having regularly recurring mounting points, which are intended for fastening the insulator bearing the contact line, for fastening the rails, and for fastening the support device.

6. The line section according to claim 5, wherein the at least one base plate has, between mounting points for the insulator bearing the contact line and the mounting points for the adjacent rail, other mounting points which are intended for the mounting of at least one protective cover.

7. The line section according to claim 5, wherein the at least one base plate has, in a spatial region to the contact line opposite of the tracks, other mounting points which are intended for the mounting of at least one protective cover.

8. The line section according to claim 7, wherein a portion or a part of the at least one base plate constitutes or bears a sidewalk with relatively similar positions and separations from one another of the sidewalk, of the contact line, of the insulator, and the at least one protective covers within the line section.

9. The line section according to claim 1, wherein devices supplied with current are borne by the support device.

10. A line section for the operation of electrically driven rail vehicles, with a track having two parallel rails, with a contact line borne by an insulator, said contact line being arranged on one side of the track in a spatial region extending parallel to the rails, wherein the contact line is intended to supply the current-collectors of the electrically driven rail vehicles with current and to support said current-collectors from underneath, and wherein the contact line and the insulator bearing the contact line are intermittently interrupted or not interrupted, wherein a support device, which is non-functional for the power supply of the rail vehicle, is arranged on the other side of the track in a second spatial region extending parallel to the rails, said support device being intended to support current-collectors of the electrically driven rail vehicles from underneath without providing current, wherein the line section includes at least one base plate having regularly recurring mounting points which are intended for fastening the insulator bearing the contact line, for fastening the rails, and for fastening the support device.

11. The line section according to claim 10, wherein the surfaces of the contact line and of the support device, which are intended for supporting the current-collectors are situated in a plane, the separations of which, measured perpendicular to the plane from the first rail and from the second rail of the track, are equal.

12. The line section according to claim 10, wherein at least one of the contact line, and the insulator bearing the contact line and the support device has been intermittently interrupted and replaced by a movable support device.

13. The line section according to claim 12, wherein at least one movable support device is capable of being moved horizontally about a pivot.

14. The line section according to claim 12, wherein at least one movable support device is capable of being moved vertically between an operative position, intended for supporting the current-collector of a rail vehicle, and an inoperative position.

15. The line section according to claim 10, wherein the at least one base plate has, between mounting points for the insulator bearing the contact line and the mounting points for the adjacent rail, other mounting points which are intended for the mounting of at least one protective cover.

16. The line section according to claim 10, wherein the at least one base plate has, in a spatial region to the contact line opposite of the tracks, other mounting points which are intended for the mounting of at least one protective cover.

17. The line section according to claim 16, wherein a portion or a part of the at least one base plate constitutes or bears a sidewalk with relatively similar positions and separations from one another of the sidewalk, of the contact line, of the insulator, and of the at least one protective cover within the line section.

18. The line section according to claim 10, wherein devices supplied with current are borne by the support device.

19. A line section for the operation of electrically driven rail vehicles having current collectors supplied with electrical current, the line section comprising:
- a track having two parallel rails;
- a contact line having intermittently interrupted and uninterrupted portions extending along the rails on one side of the track in a first spatial region to conduct power and support current-collectors of the electrically driven rail vehicles; and
- a support device electrically nonconductive of power to current-collectors and arranged on another side of the track in a second spatial region extending along the rails to support current-collectors of the electrically driven rail vehicles at the intermittently interrupted and uninterrupted portions of the contact line.

20. The line section according to claim 19, wherein the contact line is borne by an insulator.

21. The line section according to claim 20, wherein at least one of the contact line and the insulator bearing the contact line and the support device has been intermittently interrupted and replaced by a movable support device.

22. The line section according to claim 21, wherein at least one movable support device is capable of being moved horizontally about a pivot.

23. The line section according to claim 21, wherein at least one movable support device is capable of being moved vertically between an operative position, intended for supporting the current-collector of a rail vehicle, and an inoperative position.

24. The line section according to claim 19, wherein the contact line and support device support the current collectors of the electrically driven rail vehicles from underneath.

25. The line section according to claim 19, wherein the two parallel rails are a first rail and a second rail situated in a first plane.

26. The line section according to claim 25, wherein the contact line and support device include surfaces situated in the first plane.

27. The line section according to claim 26, wherein the surfaces of the contact line and the support device are approximately equally spaced apart from the first rail and from the second rail of the track as measured perpendicular to the first plane.

28. The line section according to claim 19, wherein the line section includes at least one base plate having regularly recurring mounting points, which are intended for fastening the insulator bearing the contact line, for fastening the rails, and for fastening the support device.

29. The line section according to claim 28, wherein the at least one base plate has, between mounting points for the insulator bearing the contact line and the mounting points for the adjacent rail, other mounting points which are intended for the mounting of at least one protective cover.

30. The line section according to claim 29, wherein the at least one base plate has, in a spatial region to the contact line opposite to the tracks, other mounting points which are intended for the mounting of at least one protective cover.

31. The line section according to claim 29, wherein a portion or a part of the at least one base plate constitutes or bears a sidewalk with relatively similar positions and separations from one another of the sidewalk, of the contact line, of the insulator, and the at least one protective cover within the line section.

32. The line section according to claim 19, wherein devices supplied with current are borne by the support device.

* * * * *